(12) United States Patent
Anderton et al.

(10) Patent No.: US 11,853,328 B2
(45) Date of Patent: Dec. 26, 2023

(54) ADAPTIVE MULTI-MODEL ITEM SELECTION SYSTEMS AND METHODS

(71) Applicant: Spotify AB, Stockholm (SE)

(72) Inventors: Jesse Anderton, Princeton Junction, NJ (US); Maryam Aziz, Princeton Junction, NJ (US); David Bourgin, Brooklyn, NY (US); Benjamin Austin Carterette, Wilmington, DE (US)

(73) Assignee: Spotify AB, Stockholm (SE)

( * ) Notice: Subject to any disclaimer, the term of this patent is extended or adjusted under 35 U.S.C. 154(b) by 181 days.

(21) Appl. No.: 17/552,874

(22) Filed: Dec. 16, 2021

(65) Prior Publication Data

US 2023/0195753 A1 Jun. 22, 2023

(51) Int. Cl.
*G06F 16/00* (2019.01)
*G06F 16/28* (2019.01)
*G06N 3/08* (2023.01)

(52) U.S. Cl.
CPC .......... *G06F 16/285* (2019.01); *G06N 3/08* (2013.01)

(58) Field of Classification Search
CPC .................................................. G06F 16/285
USPC ....................................................... 707/769
See application file for complete search history.

(56) References Cited

U.S. PATENT DOCUMENTS

| | | | |
|---|---|---|---|
| 11,036,764 B1 * | 6/2021 | Zelenov | G06F 16/906 |
| | | | 707/707 |
| 2008/0114756 A1 | 5/2008 | Konig | |
| 2018/0108048 A1 | 4/2018 | Yoon | |

OTHER PUBLICATIONS

Agarwal, A. et al., "Taming the monster: A fast and simple algorithm for contextual bandits", 2014, In International Conference on Machine Learning, pp. 1638-1646.
Agrawal, S. et al., "Thompson Sampling for Contextual Bandits with Linear Payoffs", In Proceedings of the 30th International Conference on International Conference on Machine Learning, vol. 28, ICML'13, 2013, III-1220-III-1228. JMLR.org, 9 pages.
Auer, P. et al., "Finite-time analysis of the multiarmed bandit problem", Machine Learning, 2002, 47(2-3): 235-256.
Bietti, A. et al., "A contextual bandit bake-off", 2018, arXiv preprint arXiv: 1802.04064, 49 pages.
Chapelle, O. et al., "An Empirical Evaluation of Thompson Sampling", In Shawe-Taylor, et al. eds., Advances in Neural Information Processing Systems 24, 2249-2257. Curran Associates, Inc., URL http://papers.nips.cc/paper/4321-an-empirical-evaluation-of-thompson-sampling.pdf, 9 pages.

(Continued)

*Primary Examiner* — Alexandria Y Bromell
(74) *Attorney, Agent, or Firm* — Merchant & Gould P.C.

(57) ABSTRACT

An adaptive multi-model item selection method, comprising: receiving, from one of a plurality of client devices, a request including a client-side feature vector representing a state of the client device; determining, by an advocate model, a probability distribution of a plurality of specialist cluster models from the client-side feature vector; choosing, by a use case selector, a cluster corresponding to a use case from the probability distribution; and obtaining, by the use case selector based on the cluster (i.e., the cluster that was sampled by the user case selector), a specialist cluster model from the plurality of specialist cluster models.

21 Claims, 5 Drawing Sheets

(56) References Cited

OTHER PUBLICATIONS

Chu, W. et al., "Contextual bandits with linear payoff functions", 2011, In Proceedings of the Fourteenth International Conference on Artificial Intelligence and Statistics, pp. 208-214.

Dumitrascu, Bianca et al., "PG-TS: Improved Thompson Sampling for Logistic Contextual Bandits", 32nd Conf. on Neural Information Processing Systems (NeurIPS 2018), Montreal, Canada, pp. 4624-4633.

Foster, D.J. et al., "Practical contextual bandits with regression oracles", 2018, arXiv preprint arXiv:1803.01088, 10 pages.

Gentile, C. et al., "On context-dependent clustering of bandits", 2017, In International Conference on Machine Learning, pp. 1253-1262. PMLR.

Gentile, Claudia et al., "Online Clustering of Bandits", Proc. of the 31st Int'l. Conference on Machine Learning, Beijing, China, 2014, JMLR; W&CP vol. 32, 9 pages.

Harper, F.M. et al., "The movielens datasets: History and context", 2015, ACM transactions on inter active intelligent systems (TIIS) 5(4): 1-19.

Kaufmann, E. et al., "Thompson sampling: An asymptotically optimal finite-time analysis", 2012, In International conference on algorithmic learning theory, Springer, 16 pgs.

Langford, J. et al., "The Epoch-Greedy Algorithm for Contextual Multi-Armed Bandits", 2007, In Proceedings of the 20th International Conference on Neural Information Processing Systems, NIPS'07, 8 pgs.

Li, L. et al., "A contextual-bandit approach to personalized news article recommendation", 2010, In Proceedings of the 19th international conference on World wide web, pp. 661-670.

Li, S. et al., "Improved algorithm on online clustering of bandits", 2019, arXiv preprint arXiv:1902.09162, 7 pages.

Li, S. et al., "Collaborative filtering bandits", 2016, In Proceedings of the 39th International ACM SIGIR conference on Research and Development in Information Retrieval, pp. 539-548.

Maillard, O.-A. et al., "Latent Bandits", 2014, in International Conference on Machine Learning, pp. 136-144.

Nguyen, Trong et al., "Dynamic Clustering of Contextual Multi-Armed Bandits", (2014), CIKM'14: Proceedings of the 2014 ACM International Conference on Information and Knowledge Management: Nov. 3-7, 2014, Shanghai, China. 1959-1962, Research Collection School of Information Systems, Available at: https://ink.library.smu.edu.sg/sis_research/2328, pp. 1959-1962.

Pichl, Martin et al., "User models for multi-context-aware music recommendation", Jun. 2021, Multimedia Tools and Applications 80(3): 1-23.

Thompson, W. R., "On the likelihood that one unknown probability exceeds another in view of the evidence of two samples", 1933, Biometrika 25(3/4): 285-294.

Van Wieringen, W. N., "Lecture notes on ridge regression", 2015, arXiv preprint arXiv:1509.09169, 56 pages.

* cited by examiner

ADAPTIVE MULTI-MODEL ITEM
SELECTION SYSTEMS AND METHODS

TECHNICAL FIELD

Embodiments of the present invention generally relate to computer technology for solving technical challenges in item selection, and, more particularly, to item selection systems that utilize contextual bandits to select specialized models based on contextual features.

BACKGROUND

Many real-world datasets are drawn from mixtures of distributions. The individual distributions that are combined to form the mixture distribution are the mixture components. In recommendation systems, these mixture components might correspond to subpopulations with different preferences, and a user of the recommendation systems might fall under multiple such subpopulations depending on context. In music recommendation, for example, a preference of a user might significantly change, for example, based on time of day or device they are currently using, where the time of day and device type are available as contextual features. But simply knowing the user's time and device type is insufficient to explain the various nuances that impact their music preferences. Typical approaches to this problem either ignore the latent structure of the data and learn a single global model or learn clusters that are insensitive to rapid shifts in user preference.

Such approaches have used contextual bandits. Generally, a contextual bandit is a learning framework for modeling sequential decision-making problems. In a contextual bandit algorithm, a learner is given a choice among K actions or arms, for which contexts are available as d-dimensional feature vectors, across T sequential rounds. During each round, the learner uses information from previous rounds to estimate associations between contexts and rewards. The learner's goal in each round is to select the arm that minimizes the cumulative regret, which is the difference between the optimal oracle rewards and the observed rewards from the chosen arms. To do this, the learner must balance exploring arms that improve the expected reward estimates and exploiting the current expected reward estimates to select arms with the largest expected reward.

Typical contextual bandit approaches address this problem by dynamically clustering users so that as users' preferences change, so does their cluster assignment. However, there are several problems seen across these known approaches. For example, due to periodically clustering all users these approaches do not scale efficiently to large user populations. This is referred to sometimes as a scalability problem. Known approaches also would benefit from accounting better for new users. This is referred to sometimes as a cold start problem. In addition, these approaches would benefit from improved accounting for users who return infrequently. This issue is referred to as a popularity bias problem. Still further such approaches do not typically allow for a user to be a member of more than one cluster (i.e. content preference subpopulation). This is referred to sometimes as a hard clustering problem. Moreover, due to using "hard" clustering techniques, existing approaches would benefit from accounting for uncertainty over cluster assignments for users with little available data. All these problems can lead to poor item selection (e.g., content item recommendation), a significant waste of computing resources, and poor asymptotic complexity. What is needed is an improved mechanism in which real-world data is drawn from mixtures of distributions, each representing a different subpopulation.

There is a need, therefore, for an approach that more efficiently utilizes computing resources and provides better statistical efficiency. Such a mechanism would particularly be useful in the context of item (e.g., content item) selection where users belong to different mixture components to varying degrees representing their preferences conditioned on context.

SUMMARY

The example embodiments described herein meet the above-identified needs by providing methods, systems and computer program products for adaptive multi-model item selection. Aspects of the present invention generalize clustering bandit approaches to cases where users can be members of multiple clusters to varying degrees. Side information in the form of user request context features that can impact what the user wants in that particular moment (e.g., time of day, day of week, occasion, device type and the like) informs which cluster's model should handle a recommendation request. A separate contextual bandit determines preference nuances within a subpopulation. Based on the results, an item is selected from a database of items for each cluster (e.g., a recommendation). In turn, the selected item is presented to a computing device associated with a particular client (e.g., user/client account).

In one embodiment, a method for adaptive multi-model item selection includes receiving, from a client device of a plurality of client devices, a request including a client-side feature vector representing a state of the client device; determining, e.g., by an advocate model, a probability distribution of a plurality of specialist cluster models from the client-side feature vector; choosing, e.g., by a use case selector, a cluster corresponding to a use case from the probability distribution; and obtaining, by the use case selector based on the cluster (i.e., the cluster that was sampled by the user case selector), a specialist cluster model from the plurality of specialist cluster models.

In some embodiments, the method further includes selecting, e.g., an item selector interface, an item from a database of items using the specialist cluster model. In an example implementation the item selector interface is a content item selector interface and the item is a content item.

In some embodiments, the method includes scoring, by the advocate model, the client-side feature vector based on an estimate of a probability the client-side feature vector is associated with each cluster of a plurality of clusters.

In an example the implementation sampling, by the use case selector, includes choosing by randomly sampling the cluster.

In some embodiments, the method further comprises: receiving, from a server, a plurality of server-side client feature vectors, each server-side client feature vector representing any one of (i) a set of item features associated with a plurality of items available to a client device, (ii) a set of client features associated with at least one client device, or (iii) a combination of (i) and (ii); storing, in a memory device, a plurality of mini-specialist cluster models, each mini-specialist cluster model of the plurality of mini-specialist cluster models being (i) associated with a corresponding client-side feature vector and (ii) trained on the plurality of server-side client feature vectors; clustering, the plurality of mini-specialist cluster models, to obtain a soft cluster assignment for each of the mini-specialist cluster models, thereby generating a plurality of soft cluster assignments;

and training, (e.g., by a model trainer) each of the plurality of specialist cluster models by combining the plurality of mini-specialist cluster models based on the soft cluster assignments associated with the mini-specialist cluster models. In an example implementation the client-side feature vector includes a first set of client context features (e.g., a device parameter, a time of day, a mode (e.g., car, workout, running), or a type of device) and the server-side client feature vectors include a plurality of second sets of client context features (e.g., consumption history of user accounts, taste profiles logged for user accounts). In some embodiments, the method further comprises: determining whether to retrain (e.g., by the model trainer) any one of the plurality of mini-specialist cluster models; and retraining the mini-specialist cluster models according to the determining.

In an example implementation reclustering is performed after a predetermined number of requests have been received. In some embodiments, the method further comprises: receiving, from a training frequency calculator, an instruction to retrain the mini-specialist cluster models.

In some embodiments, the method further comprises: receiving, by the specialist cluster model (e.g., via an interface in communication with a database of items), a plurality of items available for selection and a plurality of item feature vectors corresponding to the plurality of items; and selecting, e.g., by an item selector interface, an item from the database of items using the specialist cluster model.

In some embodiments, the method further comprises: training (e.g., by the model trainer) a contextual bandit for each of the plurality of specialist cluster models on (1) a plurality of client-side feature vectors associated with the client device and (2) a plurality of server-side client feature vectors representing a set of features associated with a plurality of requests from the plurality of client devices, to predict the probability distribution. In an example implementation training the contextual bandit for each of the plurality of specialist cluster models generates a plurality of advocate contextual bandits, and each specialist cluster model is associated with one of the plurality of advocate contextual bandits.

In some embodiments, the method further comprises: receiving, by the advocate model via an advocate model interface the client-side feature vector.

In another embodiment, there is provided a system for multi-model item selection, comprising: a data communication device configured to receive, from one of a plurality of client devices, a request including a client-side feature vector representing a state of the client device; a memory device configured to store an advocate model and one or more specialist cluster models; an analyzer configured to determine, using an advocate model, a probability distribution of a plurality of specialist cluster models from the client-side feature vector; and a use case selector configured to: choose a cluster corresponding to a use case from the probability distribution, and obtain, based on the cluster, a specialist cluster model from the plurality of specialist cluster models.

In some embodiments, the system further comprises an item selector interface configured to select an item from a database of items using the specialist cluster model.

In some embodiments, the item selector interface is a content item selector interface and the item is a content item.

In some embodiments, the advocate model is further configured to score the client-side feature vector based on an estimate of a probability the client-side feature vector is associated with each cluster of a plurality of clusters.

In some embodiments, the use case selector is further configured to choose the cluster by randomly sampling a cluster from the probability distribution.

In some embodiments, the analyzer is further configured to: receive a plurality of server-side client feature vectors, each server-side client feature vector representing any one of (i) a set of item features associated with a plurality of items available to a client device, (ii) a set of client features associated with at least one client device, or (iii) a combination of (i) and (ii); and the memory device is further configured to: store a plurality of mini-specialist cluster models, each mini-specialist cluster model of the plurality of mini-specialist cluster models being (i) associated with a corresponding client-side feature vector and (ii) trained on the plurality of server-side client feature vectors; the analyzer is further configured to: cluster the plurality of mini-specialist cluster models to obtain a soft cluster assignment for each of the mini-specialist cluster models, thereby generating a plurality of soft cluster assignments; and the embodiment further comprises a model trainer configured to train each of the plurality of specialist cluster models by combining the plurality of mini-specialist cluster models based on the soft cluster assignments associated with the mini-specialist cluster models.

In some embodiments, the client-side feature vector includes a first set of client context features and the server-side client feature vectors include a plurality of second sets of client context features.

In some embodiments, the system further comprises: an item selector interface configured to select an item from a database of items using the specialist cluster model, and wherein the specialist cluster model is further configured to receive a plurality of items available for selection and a plurality of item feature vectors corresponding to the plurality of items.

In some embodiments, the system further comprises a training frequency calculator configured to: determine whether to retrain any one of the plurality of mini-specialist cluster models; and cause the model trainer to retrain the mini-specialist cluster models according to the determining.

In some embodiments, the use case selector is further configured to recluster the plurality of mini-specialist cluster models after a predetermined number of requests have been received.

In some embodiments, the system further comprises a training frequency calculator configured to receive an instruction to retrain the mini-specialist cluster models.

In some embodiments, wherein the model trainer is further configured to: train a contextual bandit for each of the plurality of specialist cluster models on (1) a plurality of client-side feature vectors associated with the client device and (2) a plurality of server-side client feature vectors representing a set of features associated with a plurality of requests from the plurality of client devices, to predict the probability distribution.

In some embodiments, training the contextual bandit for each of the plurality of specialist cluster models generates a plurality of advocate contextual bandits; and each specialist cluster model is associated with one of the plurality of advocate contextual bandits.

In some embodiments, the system further comprises an advocate model interface configured to communicate the client-side feature vector to the advocate model.

In another embodiment there is provided a computer system, comprising: one or more processors; and a non-transitory computer-readable storage medium storing instructions that when executed by the one or more processors cause the computer system to perform operations, comprising: receiving, from a client device of a plurality of client devices, a request including a client-side feature vector representing a state of the client device; determining, by an advocate model, a probability distribution of a plurality of specialist cluster models from the client-side feature vector; choosing, by a use case selector, a cluster corresponding to a use case from the probability distribution; and obtaining, by the use case selector based on the cluster, a specialist cluster model from the plurality of specialist cluster models.

In some embodiments, the sequence of instructions causes the one or more processors to perform: selecting, by an item selector interface, an item from a database of items using the specialist cluster model.

In some embodiments, the item selector interface is a content item selector interface and the item is a content item.

In some embodiments, the sequence of instructions causes the one or more processors to perform: scoring, by the advocate model, the client-side feature vector based on an estimate of a probability the client-side feature vector is associated with each cluster of a plurality of clusters.

In some embodiments choosing the cluster corresponding to the use case from the probability distribution includes randomly sampling a cluster.

In some embodiments, the sequence of instructions causes the one or more processors to perform: receiving, from a server, a plurality of server-side client feature vectors, each server-side client feature vector representing any one of (i) a set of item features associated with a plurality of items available to a client device, (ii) a set of client features associated with at least one client device, or (iii) a combination of (i) and (ii); storing, in a memory device, a plurality of mini-specialist cluster models, each mini-specialist cluster model of the plurality of mini-specialist cluster models being (i) associated with a corresponding client-side feature vector and (ii) trained on the plurality of server-side client feature vectors; clustering the plurality of mini-specialist cluster models to obtain a soft cluster assignment for each of the mini-specialist cluster models, thereby generating a plurality of soft cluster assignments; and training, by a model trainer, each of the plurality of specialist cluster models by combining the plurality of mini-specialist cluster models based on the soft cluster assignments associated with the mini-specialist cluster models.

In some embodiments, the client-side feature vector includes a first set of client context features and the server-side client feature vectors include a plurality of second sets of client context features.

In some embodiments, the sequence of instructions causes the one or more processors to perform: receiving, by the specialist cluster model, a plurality of items available for selection and a plurality of item feature vectors corresponding to the plurality of items; and selecting, by an item selector interface, an item from the database of items using the specialist cluster model.

In some embodiments, the sequence of instructions causes the one or more processors to perform: determining whether to retrain any one of the plurality of mini-specialist cluster models; and retraining, by the model trainer, the mini-specialist cluster models according to the determining.

In some embodiments, the sequence of instructions causes the one or more processors to perform: reclustering the plurality of mini-specialist cluster models after a predetermined number of requests have been received.

In some embodiments, the sequence of instructions causes the one or more processors to perform: receiving, from a training frequency calculator, an instruction to retrain the mini-specialist cluster models.

In some embodiments, the sequence of instructions causes the one or more processors to perform: training, by a model trainer, a contextual bandit for each of the plurality of specialist cluster models on (1) a plurality of client-side feature vectors associated with the client device and (2) a plurality of server-side client feature vectors representing a set of features associated with a plurality of requests from the plurality of client devices, to predict the probability.

In some embodiments, training the contextual bandit for each of the plurality of specialist cluster models generates a plurality of advocate contextual bandits; and each specialist cluster model is associated with one of the plurality of advocate contextual bandits.

In some embodiments, the sequence of instructions causes the one or more processors to perform: receiving, by the advocate model via an advocate model interface the client-side feature vector.

BRIEF DESCRIPTION OF THE DRAWINGS

The features and advantages of the example embodiments of the invention presented herein will become more apparent from the detailed description set forth below when taken in conjunction with the following drawings.

DETAILED DESCRIPTION

The example embodiments of the invention presented herein are directed to methods, systems and computer program products for adaptive multi-model item selection, which are now described herein in terms of an example item selector that selects media content items. In the example implementation, the item selector is a media content item recommendation system that personalizes media content item selection for individual users. This description is not intended to limit the application of the example embodiments presented herein. In fact, after reading the following description, it will be apparent to one skilled in the relevant art(s) how to implement the following example embodiments in alternative embodiments (e.g., involving any item selection systems involving models trained over weakly-informative features) or other types of items for implementation in, for example, the field of medicine selection or product selection.

Figure 1:
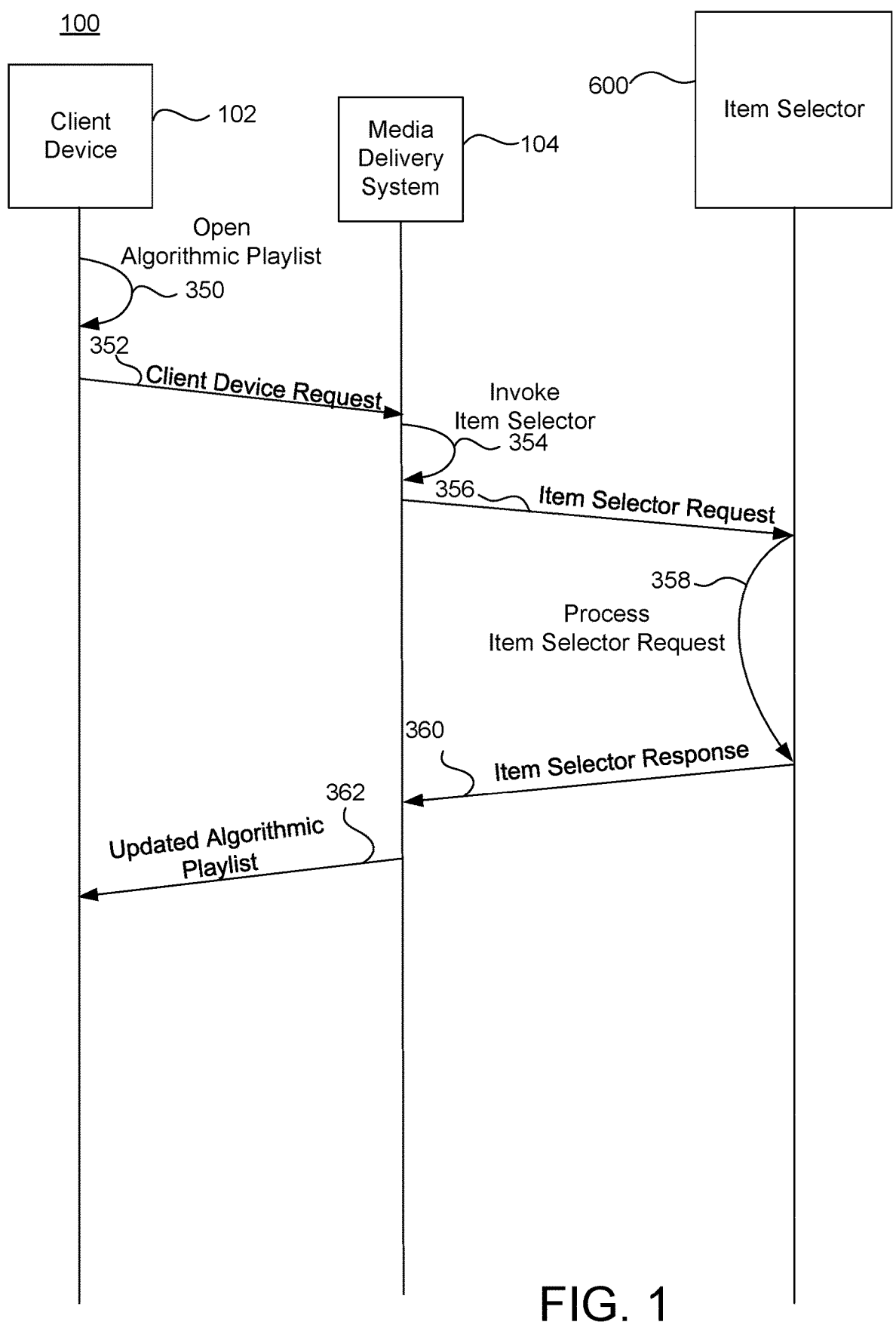
FIG. 1 depicts a system flow diagram displaying how data flows in a system for performing adaptive multi-model item selection in accordance with an embodiment of the present invention.

FIG. 1 depicts a system flow diagram 100 displaying how data flows in a system for performing adaptive multi-model item selection in accordance with an embodiment of the present invention. The system includes a client device 102, a media delivery system 104, and an item selector 600. In some embodiments, item selector 600 can be incorporated in media delivery system 104 as a subsystem. In other embodiments, item selector 600 is an independent system and communicatively coupled (e.g., via an application programming interface (API)).

Referring still to FIG. 1, at step 350, a client device 102 executes an operation that causes an algorithmic playlist to be opened. An algorithmic playlist is put together by a computer, using input about, for example, favorite songs, artists and genres, as well as by gathering and using data on listening habits and other information. An algorithmic playlist can thus be a playlist that has been personalized for a particular account holder (e.g., an account of a user). An example algorithmic playlist may include, for example, a list of media content items released the most recent week by artists determined to be the account holder's favorite (e.g., based on a user's listening history and/or based on which artists they follow).

Upon opening the algorithmic playlist, at step 352, client device 102 transmits a request (referred to herein sometimes as a client device request or client request) to media delivery system 104 requesting the media delivery system to update the algorithmic playlist. The media delivery system 104 receives the client device request to update the algorithmic playlist from client device 102 and executes a process that invokes item selector 600, as shown in step 354. In turn, media delivery system 104 forwards a request (referred to for convenience as an item selector request) to the item selector 600, as shown in step 356. Item selector 600 receives the item selector request and processes the item selector request as shown in step 358 in accordance with the example embodiments described herein. After item selector 600 processes the item selector request item selector 600 communicates the result (referred to for convenience as an item selector response) to the media delivery system 104 as shown in step 360. In turn, media delivery system 104 generates an updated algorithmic playlist and communicates it to client device 102, as shown in step 362.

In some embodiments, media delivery system 104 can also stream a media content item to client device 102.

Alternatively, client device request is communicated directly to item selector 600 which, in turn, generates the updated algorithmic playlist based on the client device request, a corpus of media content items, and any applicable metadata.

As described above with respect to the example embodiment depicted in FIG. 1, in some embodiments, media delivery system 104 can be an intermediary between the client device 102 and the item selector 600 or the client device 102 can communicate directly with the item selector 600. For simplicity as used herein a client device request and an item selector request can be referred to as a request. However, it should be understood that request can mean either a client device request received directly from a client device 102 or an item selector request received via media delivery system 104. Thus, in some embodiments the client device request (referred to below simply as a request) can invoke the item selector 600 to cause the algorithmic playlist to be updated.

In the example implementation depicted in FIG. 1, the item selector request communicated from the media delivery system 104 to item selector 600 in step 356 can include a client-side feature vector and a list of items that can be served by media delivery system 104 (e.g., media content items available for streaming or downloading by media delivery system 104). In this example implementation, the item selector response communicated by the item selector 600 to the media delivery system 104 (step 360) identifies the particular item(s) to be served by media delivery system 104. In some embodiments, additional information (e.g., the particular use case of the client device predicted by the item selector 600) corresponding to the item(s) can be included in the item selector response. Thus the item selector 600 need not contain a database of items itself.

In some embodiments, the item selector response can include options for the media delivery system 104. This may be useful if additional information about the client device 102 is known only by the media delivery system 104 and not the item selector 600, thereby allowing the media delivery system 104 to make the final decision as to how to update the algorithmic playlist.

Figure 2:
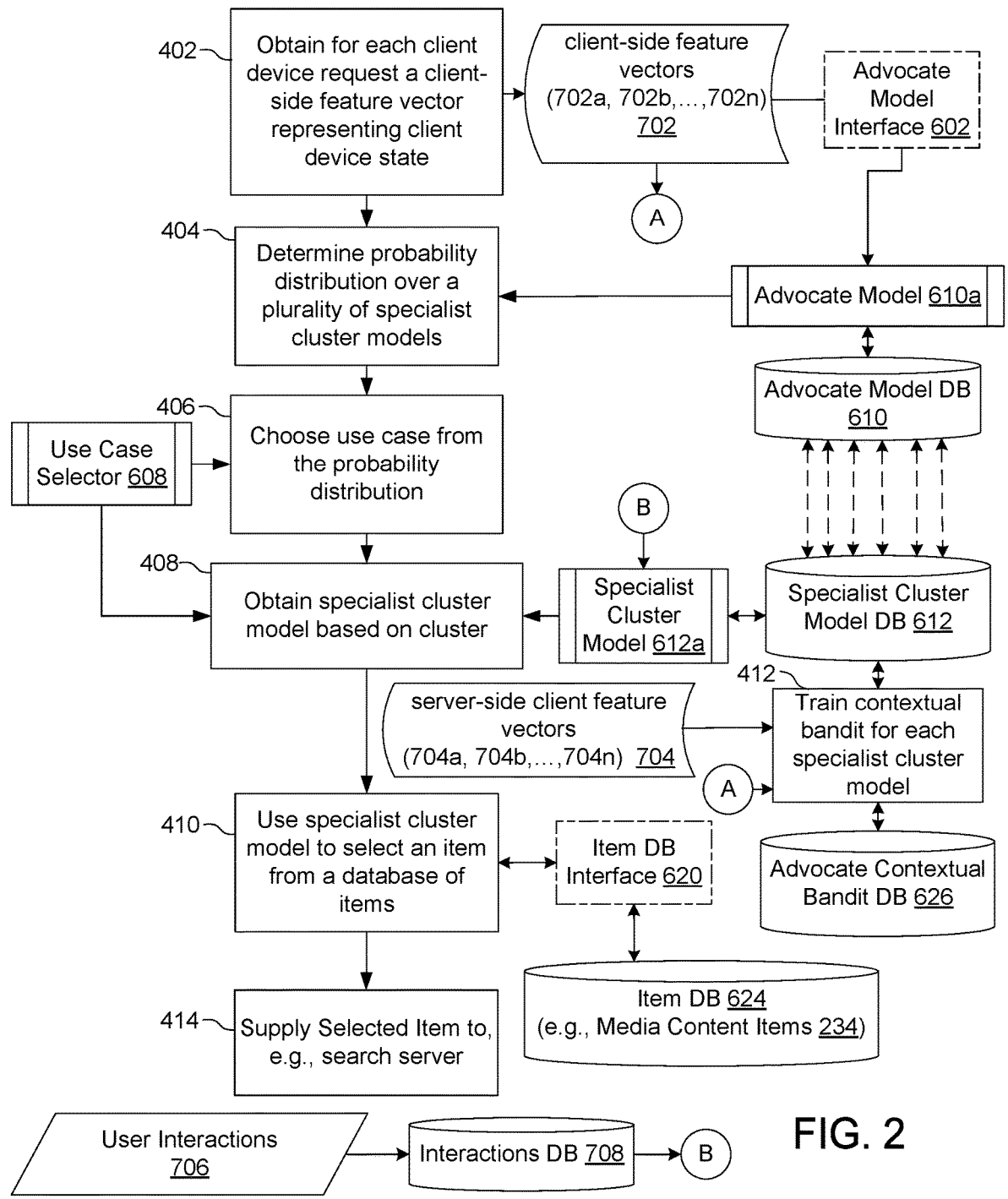
FIG. 2 illustrates a flow diagram of an adaptive multi-model item selection method according to an example embodiment.

FIG. 2 illustrates a flow diagram of an adaptive multi-model item selection method 400 according to an example embodiment. Referring to both FIG. 1 and FIG. 2, at step 402, a request including a client-side feature vector $702a$, $702b$, ..., $702n$ (individually and collectively referred to herein as a client-side feature vector(s) 702) is received from each client device 102. In an example implementation, the client-side feature vector 702 represents a state of a respective client device 102. As shown in FIG. 2, server-side client feature vectors $704a$, $704b$, ..., $704n$ (individually and collectively referred to herein as server-side client feature vector(s) 704) are collected. As explained below in connection with FIG. 3, server-side client feature vectors 704 are obtained from media delivery system 104. The server-side client feature vectors include a plurality of second sets of client context features such as consumption history of user accounts, taste profiles logged for user accounts and the like.

In some embodiments the request (including a client-side feature vector 702) can be transmitted by the client device 102 directly to the item selector 600 and in other embodiments the request can be transmitted by the client device 102 to media delivery system 104 and in turn to item selector 600. In other words, the client device request can be received by item selector 600 directly. Alternatively, the client device request can be received by media delivery system 104 and forwarded to item selector 600.

In an example implementation, each client-side feature vector 702 contained in the client device request corresponds to different client context features. Client context features are features that can impact what a user wants (e.g., in that particular moment). Examples of client context features are time of day, day of week, occasion, device type, and the like. At this time, a predicted use case the client device 102 is in is unknown.

At step 404, a client-side feature vector 702 is used to determine a probability distribution of a plurality of specialist cluster models. A specialist cluster model $612a$ is a model that corresponds to a particular use case. In some embodiments, the specialist cluster model $612a$ is a contextual bandit. In some embodiments, the specialist cluster models are stored in a specialist cluster model database 612. In some embodiments a probability distribution over clusters for each cluster of a plurality of client devices is not stored in persistent memory but rather temporary memory.

The probability distribution can be determined, for example, by scoring the client-side feature vector 702 as to the probability it is associated with each cluster of a plurality of clusters.

In an example implementation, a so-called advocate model $610a$ is used to determine the probability distribution of the plurality of specialist cluster models using the client-side feature vector 702. In some embodiments, advocate models are stored in an advocate model database 610.

As described above, an advocate model $610a$ is a model that uses the client-side feature vector 702 to determine the probability distribution over a plurality of specialist cluster models. In an example implementation, the advocate model 610a scores the client-side feature vector 702 as to the probability the client-side feature vector 702 is associated with each cluster of a plurality of use cases, where each use case represents a cluster. In some embodiments, the client-side feature vector 702 is scored based on an estimate of a probability the client-side feature vector 702 is associated with each cluster of a plurality of clusters.

In an example implementation, advocate model 610a receives the client-side feature vector 702 via an advocate model interface 602. Advocate model interface 602 can be an application user interface.

The probability distribution provides confidence levels indicating one or more use cases the client device is in. A use case is chosen from the probability distribution of use cases.

At step 406, a use case is chosen from the probability distribution. In an example implementation, a cluster corresponding to a use case is chosen from the probability distribution. The cluster corresponding to the use case is chosen to obtain a specialist cluster model having a high probability of being associated to the client-side feature vector 702 and ultimately to a particular account. In some embodiments, the account is associated with a user. In some embodiments the cluster is chosen by randomly sampling a cluster from a plurality of clusters. In an example implementation, a so-called use case selector 608 chooses the cluster corresponding to the use case from the probability distribution.

At step 408, a specialist cluster model 612a is obtained (e.g., sampled) from the plurality of specialist cluster models stored in specialist cluster model database 612. In some embodiments, a use case is sampled from the probability distribution (e.g., randomly) to obtain the specialist cluster model having a high probability of being associated with the client-side feature vector 702. If the request (i.e., the client-side feature vector 702) is strongly associated with one of the use cases and the advocate model for that use case is accurate, then the advocate model for that use case will output a relatively high probability value, whereas the advocate models for the other use cases will output relatively lower probabilities. In other words, the advocate models output an indication of confidence that one specialist cluster model will perform better than other specialist cluster models. In an example implementation, use case selector 608 is also used to obtain the specialist cluster model.

In some embodiments, at step 410, an item is selected from a database of items 624 using the specialist cluster model 612a. In some embodiments, the items in the database of items 624 are media content items. A media data store 226 described below in connection with FIG. 5 can store media content metadata 236 (FIG. 5) relating to items and used to select items.

Items can be, for example, media content items. A media content item is an item of media content, such as an audio content item, a video content item, or other types of media content, which may be stored in any format suitable for storing media content. Non-limiting examples of media content items include songs, albums, audiobooks, music videos, movies, television episodes, podcasts, other types of audio or video content, and portions or combinations thereof.

In some embodiments, more than one item is selected from the database of items 624 using the specialist cluster model 612a. In an example embodiment the selection is performed by item selector 600.

In some embodiments, the specialist cluster model 612a receives, e.g., via an item database interface 620 in communication with the database of items 624, a plurality of items available for selection and a plurality of item feature vectors corresponding to the plurality of items. In turn, an item selector 600 selects an item from the database of items 624 using the specialist cluster model 612a.

In some embodiments, the advocate models stored in advocate model database 610 have a one to one relationship with the specialist cluster models stored in specialist cluster model database 612. This is because each advocate model is advocating for one of the specialist cluster models. The one to one correspondence is represented in FIG. 2 by the arrows between advocate model database 610 and specialist cluster model database 612.

In some embodiments, a contextual bandit is trained for each of the plurality of specialist cluster models on (1) a plurality of client-side feature vectors 702 associated with the client device and (2) a plurality of server-side client feature vectors 704 representing a set of features associated with a plurality of requests from the plurality of client devices, to predict the probability distribution, as shown in step 412.

In some embodiments, user interactions 706, such as whether a user chooses to listen to each selected audio track, will be recorded and stored in an interactions database 708 so that each specialist cluster model can be trained with a standard regression or classification model training algorithm designed to predict these recorded interactions from the plurality of client-side feature vectors 702 and the plurality of server-side feature vectors 704.

In step 414, the results (e.g., the selected item or items) are communicated to the component delivering the updated playlist to the client device 102. In an example embodiment, the component is media delivery system 104. In another example embodiment, the component is the item selector 600. In an example implementation, the component is a search server communicatively coupled to the media delivery system. In some embodiments, the search server is in communication with item selector 600. The search server can be external to the media delivery system. In addition, the search server can include item selector 600.

Training the contextual bandit for each of the plurality of specialist cluster models in specialist cluster model database 612 generates a plurality of advocate contextual bandits and each specialist cluster model is associated with one of the plurality of advocate contextual bandits. In an example embodiment, advocate contextual bandits are stored in an advocate contextual bandit database 626. The advocate contextual bandit is constructed to receive client context features for a particular client device request and determines the probability that a specialist cluster model will sufficiently serve the client device request.

In another example embodiment, two or more client devices 102 having users who consume similar content can produce the same the client-side feature vector 702. A specialist cluster model is trained on the data received from these client devices 102. However, if the sampling of client devices 102 is too small, it may be the case that the specialist cluster model does not become adequately trained and thus performs poorly. In this embodiment the specialist cluster model can be clustered with other specialist cluster models associated with one or more different client-side feature vector(s). This aggregates the specialist cluster models into account owners (e.g., a group of users) who may have similar interests. In order to account for these specific request types (e.g., distinct use cases), a so-called mini-specialist cluster model is used. Thus, in some embodiments, instead of implementing a specialist for a particular client device (e.g., based on all the requests that come from a particular client device), a mini-specialist is generalized by being trained for multiple client feature vectors regardless of whether they are from a particular client device. This enables data to be aggregated based on the use case of multiple users rather than based on information about a particular user. In the following example embodiment, mini-specialists are combined using their soft cluster assignments. Each mini-specialist pays some fractional contribution to all of the specialists, where the fraction depends on how well that mini-specialist fits in the cluster for that mini-specialist.

Figure 3:
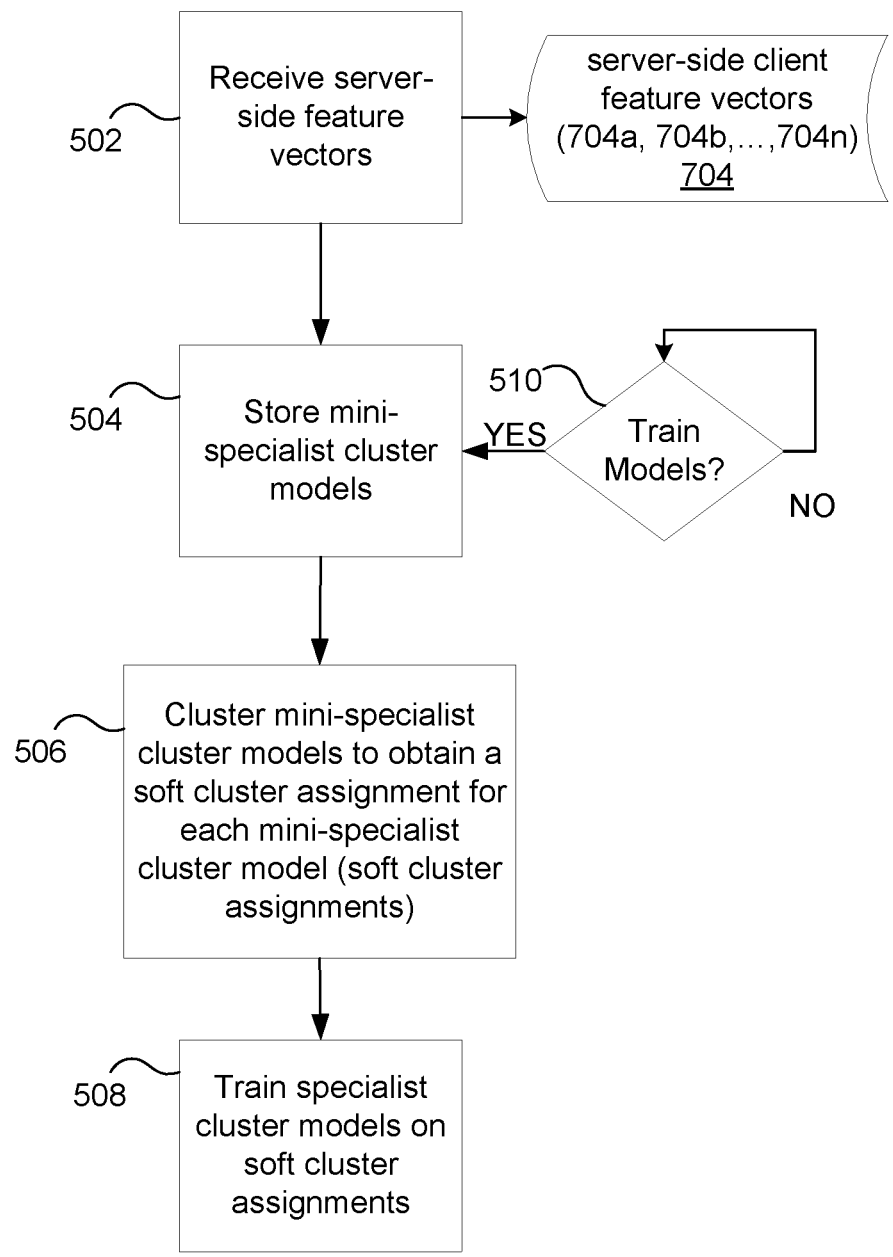
FIG. 3 illustrates a flow diagram of a procedure for processing server-side client feature vectors in accordance with an example embodiment.
Figure 5:
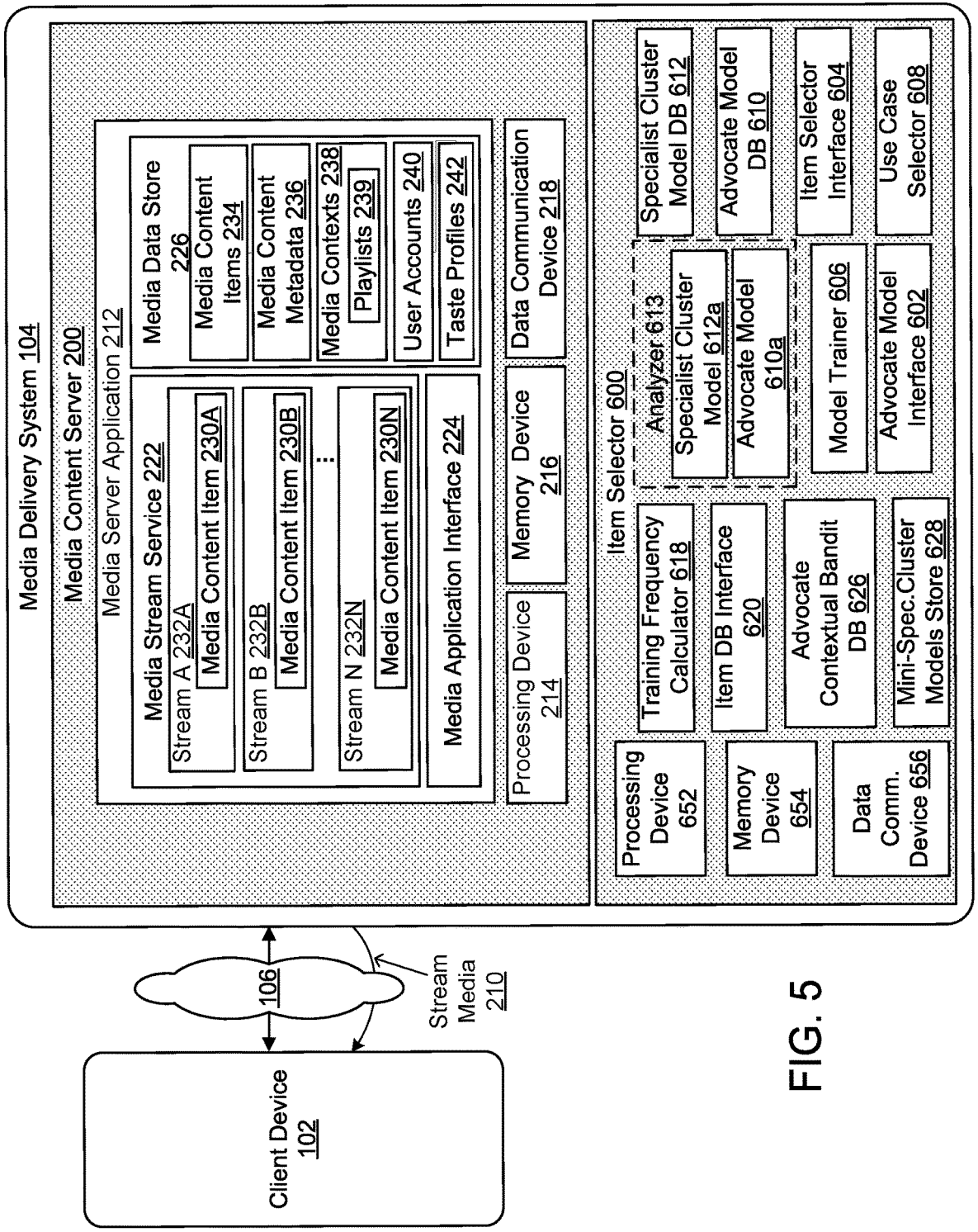
FIG. 5 is a block diagram of an example embodiment of the media delivery system of FIG. 1.

FIG. 3 illustrates a flow diagram of a procedure 500 for processing server-side client feature vectors 704 in accordance with an example embodiment. At step 502, a plurality of server-side client feature vectors 704 are received. Each server-side client feature vector 704 represents any one of (i) a set of item features associated with a plurality of items available to a client device, (ii) a set of client features associated with at least one client device 102, or (iii) a combination of (i) and (ii). The plurality of server-side client feature vectors 704 can be received, for example, by a server within a media delivery system 104 or independent item selector 600. At step 504 a plurality of mini-specialist cluster models are stored (e.g., in a memory store such as 628 (FIG. 5). Each mini-specialist cluster model of the plurality of mini-specialist cluster models is (i) associated with a corresponding client-side feature vector 702 and (ii) trained on the plurality of server-side client feature vectors 704. At step 506, the plurality of mini-specialist cluster models are then clustered to obtain a soft cluster assignment for each of the mini-specialist cluster models, thereby generating a plurality of soft cluster assignments. The cluster of mini-specialist cluster models can be across multiple client feature vectors, with an identifier or without an identifier, to obtain a plurality of distinct clusters.

At step 508, each of the plurality of specialist cluster models are trained by combining the plurality of mini-specialist cluster models based on the soft cluster assignments associated with the mini-specialist cluster models. For example, if the mini-specialist cluster models are ridge regression models then the specialist cluster models can be trained in closed form as a weighted ridge regression model which uses the soft clustering assignment weights as the regression weights. The training produces specialist cluster models and clusters.

In an example implementation, the client-side feature vector 702 includes a first set of client context features, e.g., a device parameter, a time of day, a mode (e.g., car, workout, running), or a type of device, and the server-side client feature vectors 704 include a plurality of second sets of client context features (e.g., consumption history of user accounts, taste profiles logged for user accounts).

In some embodiments, a determination is made whether to retrain any one of the plurality of mini-specialist cluster models, as shown in step 510. If so, the mini-specialist cluster models are retrained. In some implementations, item selector 600 includes a training frequency calculator 618 configured to signal when to retrain a mini-specialist cluster model. Item selector 600 receives, from the training frequency calculator 618, an instruction to retrain the mini-specialist cluster models.

The mini-specialist cluster models can be stored, such as in specialist cluster model database 612 in item selector 600.

In an example implementation, the specialist cluster models are reclustered after a predetermined number of requests have been received.

In some embodiments, item selector 600 also includes a model trainer 606 configured to perform the training of the various models described above. Item selector 600 can also include a training frequency calculator 618 which communicates with model trainer 606 to determine when the models (e.g., specialist cluster models, advocate models, advocate contextual bandits) should be retrained. In an example embodiment, the model training process reclusters, trains the specialist cluster models 612 and trains the advocate models stored in advocate models database 610. In an example embodiment, the models are retained after a predetermined number of client device requests. It should be understood that other criteria can be used to determine when to retrain the models. For example, a determination can be made that the models used at any given instant are different from the same models accounting for all the data since the last time the models were trained (e.g., data obtained from the client-side feature vectors 702 and server-side client feature vectors 704 that are not accounted for by the currently used models).

Generally, each advocate model will have a certain confidence that its corresponding specialists will perform adequately. In some embodiments, training frequency calculator 618 can determine whether the models are performing adequately. For example, training frequency calculator 618 can be configured to process user feedback. If based on user feedback a determination is made that the specialist models are not performing adequately, then that indication can be used to trigger the training frequency calculator 618 to signal model trainer 606 to retrain the corresponding model(s) (e.g., specialist cluster model).

Figure 4:
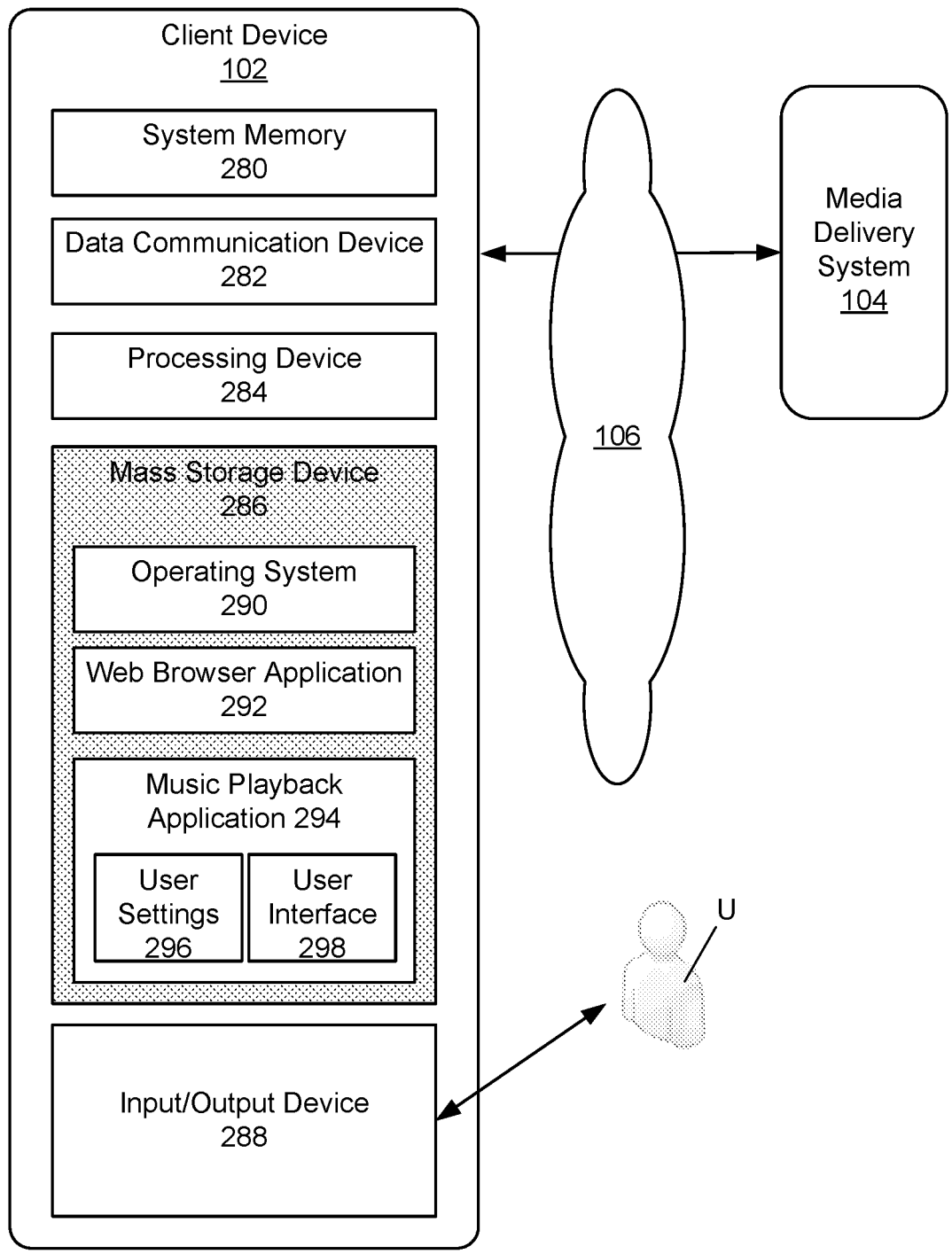
FIG. 4 is a block diagram of an example embodiment of the client device of FIG. 1.

FIG. 4 is a block diagram of an example embodiment of a client device 102. The client device 102 includes a system memory 280, a data communication device 282, a processing device 284, a mass storage device 286, and an input/output device 288.

The data communication device 282 operates to communicate with other computing devices over one or more networks, such as the network 106. Examples of the data communication device 282 include wired network interfaces and wireless network interfaces. Wireless network interfaces include infrared, BLUETOOTH® wireless technology, 802.11a/b/g/n/ac, cellular or other radio frequency interfaces wireless wide area network (WWAN) interfaces (including cellular networks), and wireless local area network (WLANs) interfaces.

The processing device 284 in some embodiments comprises one or more central processing units (CPU). In other embodiments, the processing device 284 additionally or alternatively includes one or more digital signal processors, field-programmable gate arrays, or other electronic circuits.

The mass storage device 286 includes at least an operating system 290, a web browser application 292, and a music playback application 294.

The mass storage device 286 (also referred to as a memory device) typically includes at least some form of computer-readable media. Computer-readable media includes any available media that can be accessed by the client device 102. By way of example, computer-readable media includes computer-readable storage media and computer-readable communication media.

Computer-readable storage media includes volatile and nonvolatile, removable and non-removable media implemented in any device configured to store information such as computer-readable instructions, data structures, program modules, or other data. Computer-readable storage media includes, but is not limited to, random access memory, read only memory, electrically erasable programmable read only memory, flash memory and other memory technology, compact disc read only memory, Blu-ray discs, digital versatile discs or other optical storage, magnetic storage devices, or any other medium that can be used to store the desired information and that can be accessed by the client device 102. In some embodiments, computer-readable storage media is non-transitory computer-readable storage media.

The operating system 290 provides general functionality to the client device 102. This is software that allows for basic tasks to be performed such as scheduling tasks, executing applications, and controlling peripherals.

The web browser application 292 operates to present a user interface on the client device 102 for interacting with the internet.

The media playback application 294 receives inputs for commands to listen to media content, adjust settings for media content playback, and provide profile information for a user account. The media playback application 294 receives inputs from an input/output device 288 to select media content to play. The media playback application 294 can also record actions related to the media content that is consumed to send to the media delivery system 104 to build a taste profile 242 (FIG. 5) for the user account. The media playback application 294 includes user settings 296, which can be adjusted to reflect the preferences of a user associated with the user account. Inputs are received at an input/out device 288 that instructs the media playback application 294 to modify settings for media playback. Updated settings are stored in the user settings 296 database. Music playback application 294 can also include a user interface 298 configured to present user playback options and receive user selections, for example, to control playback of media content items (e.g., play, skip, rewind, forward, and the like).

The input/output device 288 can include a keyboard, a touch screen, a camera, a QR reader, or a barcode scanner. Input is received at a client device 102 to log into a user account. The music playback application 294 then communicates the user account information to the media delivery system 104. Input/output device 288, in some embodiments, interfaces with the music playback application 294 via user interface 298. In some embodiments, the music playback application 294 invokes a request for an updated playlist as described above in connection with FIG. 1.

FIG. 5 is a block diagram of an example embodiment of the media delivery system 104 of FIG. 1. The media delivery system 104 includes a media content server 200 and an item selector 600.

The media delivery system 104 comprises one or more computing devices and provides media content to client devices such as media playback devices. In addition, the media delivery system 104 interacts with the item selector 600 to provide various functionalities including selecting media content items 230, e.g., from a corpus of media content items 234 stored in a media data store 226 according to the embodiments discussed above in connection with FIG. 1, FIG. 2 and FIG. 3 (e.g., updating playlists).

In at least some embodiments, the media content server 200 and the item selector 600 are provided by separate computing devices. In other embodiments, the media content server 200 and the item selector 600 are provided by the same computing device(s). Further, in some embodiments, at least one of the media content server 200 and the item selector 600 is provided by multiple computing devices. For example, the media content server 200 and the item selector 600 may be provided by multiple redundant servers located in multiple geographic locations.

Although FIG. 5 shows a single media content server 200 and a single item selector 600, some embodiments include multiple media servers and/or multiple item selectors. In these embodiments, each of the multiple media servers and multiple item selectors may be identical or similar to the media content server 200 and item selector 600, respectively, as described herein, and may provide similar functionality with, for example, greater capacity and redundancy and/or services from multiple geographic locations. Alternatively, in these embodiments, some of the multiple media servers and/or the multiple item selectors may perform specialized functions to provide specialized services. Various combinations thereof are possible as well.

The media content server 200 transmits stream media 210 to media playback devices such as the client device 102. In some embodiments, the media content server 200 includes a media server application 212, a processing device 214, a memory device 216, and a network access device 218. The processing device 214 and the memory device 216 may be similar to the processing device 284 and the mass storage device 286, respectively, which have each been previously described. Therefore, the description of the processing device 214 and the memory device 216 are omitted for brevity purposes.

The data communication device 218 operates to communicate with other computing devices (e.g., client device 102) over one or more networks, such as the network 106. Examples of the data communication device 218 include one or more wired network interfaces and wireless network interfaces. Examples of such wireless network interfaces of the data communication device 218 include wireless wide area network (WWAN) interfaces (including cellular networks) and wireless local area network (WLANs) interfaces. In other examples, other types of wireless interfaces can be used for the data communication device 218.

In some embodiments, the media server application 212 is configured to stream media content, such as music or other audio, video, podcasts or other suitable forms of media content. The media server application 212 includes a media stream service 222, a media application interface 224, and a media data store 226. The media stream service 222 operates to buffer media content, such as media content items 230A, 230B, and 230N (collectively 230), for streaming to one or more streams 232A, 232B, and 232N (collectively 232).

The media application interface 224 can receive requests or other communication from media playback devices or other systems, such as the client device 102, to retrieve media content items from the media content server 200. For example, referring also to FIG. 1, the media application interface 224 receives communication from the client device 102, such as the music playback application 294 thereof, to receive media content (e.g., in the form of playlists, streaming media, and/or downloadable media content) from the media content server 200.

In some embodiments, the media data store 226 stores media content items 234, media content metadata 236, media contexts 238, user accounts 240, and taste profiles 242. The media data store 226 may comprise one or more databases and file systems. Other embodiments are possible as well.

As discussed herein, the media content items 234 (including the media content items 230) may be audio, video, or any other type of media content, which may be stored in any format for storing media content.

The media content metadata 236 provides various information associated with the media content items 234. In some embodiments, the media content metadata 236 includes one or more of title, artist name, album name, length, genre, mood, era, etc.

The media content metadata 236 operates to provide various pieces of information associated with the media content items 234. In some embodiments, the media content metadata 236 includes one or more of title, artist name, album name, length, genre, mood, era, etc.

Explicit metadata refers to factual or explicit information relating to music. Explicit metadata may include album and song titles, artist and composer names, other credits, album cover art, publisher name and product number, and other information. Explicit metadata is generally not derived from the music itself or from the reactions or opinions of listeners.

At least some of the media content metadata 236, such as explicit metadata (names, credits, product numbers, etc.), for a large library of songs or tracks can be evaluated and provided by one or more third party service providers. Explicit metadata may include numerical, text, pictorial, and other information. Explicit metadata may also be stored in an XML or other file. All or portions of the metadata may be stored in separate files associated with specific tracks. All or portions of the metadata, such as acoustic fingerprints and/or description vectors, may be stored in a searchable data structure, such as a k-D tree or other database format.

Referring still to FIG. 5, each of the media contexts 238 is used to identify one or more media content items 234. In some embodiments, the media contexts 238 are configured to group one or more media content items 234 and provide a particular context to the group of media content items 234. Some examples of the media contexts 238 include albums, artists, playlists, and individual media content items. By way of example, where a media context 238 is an album, the media context 238 can represent that the media content items 234 identified by the media context 238 are associated with that album.

As described above, the media contexts 238 can include playlists 239. The playlists 239 are used to identify one or more of the media content items 234. In some embodiments, the playlists 239 identify a group of the media content items 234 in a particular order. In other embodiments, the playlists 239 merely identify a group of the media content items 234 without specifying a particular order. Some, but not necessarily all, of the media content items 234 included in a particular one of the playlists 239 are associated with a common characteristic such as a common genre, mood, or era.

In some embodiments, media content items in a playlist 239 can be played by selecting the playlist 239 via a client device 102, such as a media playback device. The media playback device then operates to communicate with the media delivery system 104 so that the media delivery system 104 retrieves the media content items identified by the playlist 239 and transmits data for the media content items to the media playback device for playback.

In some embodiments, the playlist 239 includes a playlist title and a list of content media item identifications. The playlist title is a title of the playlist, which can be received through inputs on a client device 102. The list of content media item identifications includes one or more media content item identifications (IDs) that refer to respective media content items 234.

The user accounts 240 are used to identify users of a media streaming service provided by the media delivery system 104. In some embodiments, a user account 240 allows for authentication before providing access to the media delivery system 104.

The user accounts 240 include data for devices associated with each user account. The user accounts 240 data store keeps track of the devices that can access the media content server 200 using a particular user account. In some embodiments, the user accounts 240 data store records order numbers for new devices that are ordered in order to associate the new devices with particular user accounts.

The taste profiles 242 contain records indicating media content tastes of users. A taste profile 242 can be associated with a user account and used to maintain an in-depth understanding of the music activity and preferences associated with a user account. Libraries and wrappers can be accessed to create taste profiles from a media library of the user account, social website activity and other specialized databases to mine music preferences.

In some embodiments, each taste profile 242 is a representation of media consumption activities. The media consumption activities can include a wide range of information such as artist plays, song plays, skips, dates of listen, songs per day, playlists, play counts, start/stop/skip data for portions of a song or album, contents of collections, rankings, preferences, or other mentions received via a client device, or other media plays, such as websites visited, book titles, movies watched, playing activity during a movie or other presentations, ratings, or terms corresponding to the media, such as "comedy", "sexy", etc. In addition, the taste profiles 242 can include other information. For example, the taste profiles 242 can include libraries and/or playlists of media content items associated with the user account.

The taste profiles 242 can be used for a number of purposes. One use of taste profiles is for creating personalized playlists (e.g., personal playlisting). An API call associated with personal playlisting can be used to return a playlist customized to a particular user account. For example, the media content items listed in the created playlist are constrained to the media content items in a taste profile associated with the particular user account.

Yet another use case is for personalized recommendation, where the contents of a taste profile are used to represent an individual's taste. This API call uses a taste profile as a seed for obtaining recommendations or playlists of similar artists.

Yet another example use case for taste profiles is referred to as user-to-user recommendation. This API call is used to discover users with similar tastes by comparing the similarity of taste profile item(s) associated with users.

A taste profile 242 can represent a single user account or multiple users' accounts. Conversely, a single user account can have multiple taste profiles 242. For example, one taste profile can be generated in connection with media content play activity of a user account, whereas another separate taste profile can be generated for the same user account based on the selection of media content items and/or artists for a playlist.

Referring still to FIG. 5, item selector 600 operates to provide various functionalities to the media delivery system 104. In some embodiments, the item selector 600 includes a processing device 652, a memory device 654, and a data communication device 656. The processing device 652, the memory device 654, and the data communication device 656 may be similar to the processing device 214, the memory device 216, and the data communication device 218, respectively, which have each been previously described. In some embodiments, the item selector 600 is independent of the media delivery system 104.

In some embodiments, the item selector 600 provides multi-model item selection. The data communication device 656 is configured to receive, from a client device of a plurality of client devices (e.g., 102), a request including a client-side feature vector representing a state of the client device 102. Memory device 654 can be configured to store an advocate model 610*a* and one or more specialist cluster models 612*a*. Item selector 600 further includes an analyzer 613 configured to determine, using an advocate model 610*a*, a probability distribution of a plurality of specialist cluster models stored in specialist cluster model database 612 from the client-side feature vector. Item selector 600 also includes a use case selector 608 configured to choose a cluster corresponding to a use case from the probability distribution, and obtain, based on the cluster, a specialist cluster model 612*a* from the plurality of specialist cluster models stored in a specialist cluster model database 612.

In some embodiments, the item selector 600 is configured to select an item such as media content items 234 from a database of items such as media data store 226 using the specialist cluster model 612*a*. In an example implementation, this selection is performed via an item selector interface 604.

In some embodiments, the advocate model 610*a* is further configured to score the client-side feature vector based on an estimate of a probability the client-side feature vector is associated with each cluster of a plurality of clusters.

In some embodiments, the use case selector 608 is further configured to choose the cluster by randomly sampling a cluster from the probability distribution.

In some embodiments, the analyzer 613 is further configured to receive a plurality of server-side client feature vectors 704, each server-side client feature vector representing any one of (i) a set of item features associated with a plurality of items available to a client device 102, (ii) a set of client features associated with at least one client device 102, or (iii) a combination of (i) and (ii); and the memory device 654 is further configured to store a plurality of mini-specialist cluster models, each mini-specialist cluster model of the plurality of mini-specialist cluster models being (i) associated with a corresponding client-side feature vector and (ii) trained on the plurality of server-side client feature vectors; the analyzer 613 is further configured to cluster the plurality of mini-specialist cluster models to obtain a soft cluster assignment for each of the mini-specialist cluster models, thereby generating a plurality of soft cluster assignments. In some embodiments item selector 600 includes a model trainer 606 configured to train each of the plurality of specialist cluster models stored in specialist cluster model database 612 by combining the plurality of mini-specialist cluster models based on the soft cluster assignments associated with the mini-specialist cluster models.

In some embodiments, the client-side feature vector includes a first set of client context features and the server-side client feature vectors include a plurality of second sets of client context features.

In some embodiments, an item selector interface 604 selects an item from a database of items such as media content items 234 stored in media data store 226, using the specialist cluster model. In some embodiments, the specialist cluster model 612*a* is further configured to receive items available for selection and item feature vectors corresponding to the items.

In another example embodiment, item selector 600 further includes a training frequency calculator 618 configured to: determine whether to retrain any one of the plurality of mini-specialist cluster models stored in mini-specialist cluster models store 628; and cause the model trainer 606 to retrain the mini-specialist cluster models according to the determining.

In some embodiments, the use case selector 608 is further configured to recluster the plurality of mini-specialist cluster models, for example, stored in mini-specialist cluster models store 628, after a predetermined number of requests have been received.

In some embodiments, the training frequency calculator 618 is configured to receive an instruction to retrain the mini-specialist cluster models. In some embodiments, the model trainer 606 is further configured to: train a contextual bandit for each of the plurality of specialist cluster models on (1) a plurality of client-side feature vectors 702 associated with the client device 102 and (2) a plurality of server-side client feature vectors 704 representing a set of features associated with a plurality of requests from the plurality of client devices 102, to predict the probability.

In some embodiments, training the contextual bandit for each of the plurality of specialist cluster models generates a plurality of advocate contextual bandits where each specialist cluster model is associated with one of multiple advocate contextual bandits stored in advocate contextual bandit database 626

In some embodiments, the item selector 600 further includes an advocate model interface 602 configured to communicate the client-side feature vector 702 to the advocate model 610*a*.

The performance of the one or more actions enables enhanced and automated selection and output of the data corresponding to the one or more entities (e.g. people, places, and things) from the context in which the data has been generated and stored. This means that data which is selected and output according to the processes described herein are of enhanced contextual relevance and in this regard can be automatically selected and output at significantly improved rates, for example the throughput of data selection to its output, or speed of data selection is significantly enhanced. The data which is automatically selected and output according to the processes described herein can thus be pre-emptively obtained and stored locally within a computer, or transmitted to the computer, such that the selected data is immediately accessible and relevant to a local user of the computer.

In addition, not all of the components are required to practice the invention, and variations in the arrangement and type of the components may be made without departing from the spirit or scope of the invention. As used herein, the term "component" is applied to describe a specific structure for performing specific associated functions, such as a special purpose computer as programmed to perform algorithms (e.g., processes) disclosed herein. The component can take any of a variety of structural forms, including: instructions executable to perform algorithms to achieve a desired result, one or more processors (e.g., virtual or physical processors) executing instructions to perform algorithms to achieve a desired result, or one or more devices operating to perform algorithms to achieve a desired result.

While various example embodiments of the present invention have been described above, it should be understood that they have been presented by way of example, and not limitation. It will be apparent to persons skilled in the relevant art(s) that various changes in form and detail can be made therein. Thus, the present invention should not be limited by any of the above-described example embodiments, but should be defined only in accordance with the following claims and their equivalents.

In addition, it should be understood that the FIGS. 1-5 are presented for example purposes only. The architecture of the example embodiments presented herein is sufficiently flexible and configurable, such that it may be utilized (and navigated) in ways other than that shown in the accompanying figures.

Further, the purpose of the foregoing Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the example embodiments presented herein in any way. It is also to be understood that the procedures recited in the claims need not be performed in the order presented.

Additional Clauses

The following are additional clauses relative to the present disclosure, which could be combined and/or otherwise integrated with any of the embodiments described above or listed in the claims below.

Clause 1. An adaptive multi-model item selection method, comprising:

receiving, from a client device of a plurality of client devices, a request including a client-side feature vector representing a state of the client device;

determining, by an advocate model, a probability distribution of a plurality of specialist cluster models from the client-side feature vector;

choosing, by a use case selector, a cluster corresponding to a use case from the probability distribution; and obtaining, by the use case selector based on the cluster, a specialist cluster model from the plurality of specialist cluster models.

Clause 2. The method according to Clause 1, further comprising:

selecting, by an item selector interface, an item from a database of items using the specialist cluster model.

Clause 3. The method according to Clause 2, further comprising:

wherein the item selector interface is a content item selector interface and the item is a content item.

Clause 4. The method according to Clause 1, further comprising:

scoring, by the advocate model, the client-side feature vector based on an estimate of a probability the client-side feature vector is associated with each cluster of a plurality of clusters.

Clause 5. The method according to Clause 1, wherein choosing the cluster corresponding to the use case from the probability distribution includes randomly sampling a cluster.

Clause 6. The method of Clause 1, further comprising:

receiving, from a server, a plurality of server-side client feature vectors, each server-side client feature vector representing any one of (i) a set of item features associated with a plurality of items available to a client device, (ii) a set of client features associated with at least one client device, or (iii) a combination of (i) and (ii);

storing, in a memory, a plurality of mini-specialist cluster models, each mini-specialist cluster model of the plurality of mini-specialist cluster models being (i) associated with a corresponding client-side feature vector and (ii) trained on the plurality of server-side client feature vectors;

clustering the plurality of mini-specialist cluster models to obtain a soft cluster assignment for each of the mini-specialist cluster models, thereby generating a plurality of soft cluster assignments; and training, by a model trainer, each of the plurality of specialist cluster models by combining the plurality of mini-specialist cluster models based on the soft cluster assignments associated with the mini-specialist cluster models.

Clause 7. The method of Clause 6, wherein the client-side feature vector includes a first set of client context features and the server-side client feature vectors include a plurality of second sets of client context features.

Clause 8. The method according to Clause 1, further comprising:

receiving, by the specialist cluster model, a plurality of items available for selection and a plurality of item feature vectors corresponding to the plurality of items; and selecting, by an item selector, an item from a database of items using the specialist cluster model.

Clause 9. The method according to Clause 6, further comprising:

determining whether to retrain any one of the plurality of mini-specialist cluster models; and retraining, by the model trainer, the mini-specialist cluster models according to the determining.

Clause 10. The method according to Clause 6, further comprising:

reclustering the plurality of mini-specialist cluster models after a predetermined number of requests have been received.

Clause 11. The method according to Clause 6, further comprising:

receiving, from a training frequency calculator, an instruction to retrain the mini-specialist cluster models.

Clause 12. A method according to Clause 1, further comprising:

training, by a model trainer, a contextual bandit for each of the plurality of specialist cluster models on (1) a plurality of client-side feature vectors associated with the client device and (2) a plurality of server-side client feature vectors representing a set of features associated with a plurality of requests from the plurality of client devices, to predict the probability distribution.

Clause 13. A method according to Clause 12, wherein training the contextual bandit for each of the plurality of specialist cluster models generates a plurality of advocate contextual bandits; and wherein each specialist cluster model is associated with one of the plurality of advocate contextual bandits.

Clause 14. The method according to Clause 1, further comprising:

receiving, by the advocate model via an advocate model interface the client-side feature vector.

Clause 15. A system for multi-model item selection, comprising:

a data communication device configured to receive, from one of a plurality of client devices, a request including a client-side feature vector representing a state of the client device;

a memory device configured to store an advocate model and one or more specialist cluster models;

an analyzer configured to determine, using the advocate model, a probability distribution of a plurality of specialist cluster models from the client-side feature vector; and a use case selector configured to:

choose a cluster corresponding to a use case from the probability distribution, and obtain, based on the cluster, a specialist cluster model from the plurality of specialist cluster models.

Clause 16. The system according to Clause 15, further comprising:

an item selector interface configured to select an item from a database of items using the specialist cluster model.

Clause 17. The system according to Clause 16, wherein the item selector interface is a content item selector interface and the item is a content item.

Clause 18. The system according to Clause 15, wherein the advocate model is further configured to score the client-side feature vector based on an estimate of a probability the client-side feature vector is associated with each cluster of a plurality of clusters.

Clause 19. The system according to Clause 15, wherein the use case selector is further configured to choose the cluster by randomly sampling a cluster from the probability distribution.

Clause 20. The system of Clause 15, wherein:

the analyzer is further configured to:

receive a plurality of server-side client feature vectors, each server-side client feature vector representing any one of (i) a set of item features associated with a plurality of items available to a client device, (ii) a set of client features associated with at least one client device, or (iii) a combination of (i) and (ii); and the memory device is further configured to:

store a plurality of mini-specialist cluster models, each mini-specialist cluster model of the plurality of mini-specialist cluster models being (i) associated with a corresponding client-side feature vector and (ii) trained on the plurality of server-side client feature vectors;

the analyzer is further configured to:

cluster the plurality of mini-specialist cluster models to obtain a soft cluster assignment for each of the mini-specialist cluster models, thereby generating a plurality of soft cluster assignments; and further comprising:

a model trainer configured to train each of the plurality of specialist cluster models by combining the plurality of mini-specialist cluster models based on the soft cluster assignments associated with the mini-specialist cluster models.

Clause 21. The system of Clause 20, wherein the client-side feature vector includes a first set of client context features and the server-side client feature vectors include a plurality of second sets of client context features.

Clause 22. The system according to Clause 15, further comprising:

an item selector interface configured to select an item from a database of items using the specialist cluster model, and wherein the specialist cluster model is further configured to receive a plurality of items available for selection and a plurality of item feature vectors corresponding to the plurality of items.

Clause 23. The system according to Clause 20, further comprising:

a training frequency calculator configured to:

determine whether to retrain any one of the plurality of mini-specialist cluster models; and cause the model trainer to retrain the mini-specialist cluster models according to the determining.

Clause 24. The system according to Clause 20, wherein the use case selector is further configured to recluster the plurality of mini-specialist cluster models after a predetermined number of requests have been received.

Clause 25. The system according to Clause 20, further comprising:

a training frequency calculator configured to receive an instruction to retrain the mini-specialist cluster models.

Clause 26. The system according to Clause 15, wherein the model trainer is further configured to:

train a contextual bandit for each of the plurality of specialist cluster models on (1) a plurality of client-side feature vectors associated with the client device and (2) a plurality of server-side client feature vectors representing a set of features associated with a plurality of requests from the plurality of client devices, to predict the probability distribution.

Clause 27. The system according to Clause 26, wherein training the contextual bandit for each of the plurality of specialist cluster models generates a plurality of advocate contextual bandits; and wherein each specialist cluster model is associated with one of the plurality of advocate contextual bandits.

Clause 28. The system according to Clause 15, further comprising:

an advocate model interface configured to communicate the client-side feature vector to the advocate model.

Clause 29. A computer system, comprising: one or more processors; and a non-transitory computer-readable storage medium storing instructions that when executed by the one or more processors cause the computer system to perform operations, comprising:

receiving, from a client device of a plurality of client devices, a request including a client-side feature vector representing a state of the client device;

determining, by an advocate model, a probability distribution of a plurality of specialist cluster models from the client-side feature vector;

choosing, by a use case selector, a cluster corresponding to a use case from the probability distribution; and obtaining, by the use case selector based on the cluster, a specialist cluster model from the plurality of specialist cluster models.

Clause 30. The non-transitory computer-readable medium of Clause 29, further having stored thereon a sequence of instructions for causing the one or more processors to perform:

selecting, by an item selector, an item from a database of items using the specialist cluster model.

Clause 31. The non-transitory computer-readable medium of Clause 30, further comprising:

wherein the item selector interface is a content item selector interface and the item is a content item.

Clause 32. The non-transitory computer-readable medium of Clause 29, further having stored thereon a sequence of instructions for causing the one or more processors to perform:

scoring, by the advocate model, the client-side feature vector based on an estimate of a probability the client-side feature vector is associated with each cluster of a plurality of clusters.

Clause 33. The non-transitory computer-readable medium of Clause 29, wherein choosing the cluster corresponding to the use case from the probability distribution includes randomly sampling a cluster.

Clause 34. The non-transitory computer-readable medium of Clause 29, further having stored thereon a sequence of instructions for causing the one or more processors to perform:

receiving, from a server, a plurality of server-side client feature vectors, each server-side client feature vector representing any one of (i) a set of item features associated with a plurality of items available to a client device, (ii) a set of client features associated with at least one client device, or (iii) a combination of (i) and (ii);

storing, in a memory device, a plurality of mini-specialist cluster models, each mini-specialist cluster model of the plurality of mini-specialist cluster models being (i) associated with a corresponding client-side feature vector and (ii) trained on the plurality of server-side client feature vectors;

clustering the plurality of mini-specialist cluster models to obtain a soft cluster assignment for each of the mini-specialist cluster models, thereby generating a plurality of soft cluster assignments; and training, by a model trainer, each of the plurality of specialist cluster models by combining the plurality of mini-specialist cluster models based on the soft cluster assignments associated with the mini-specialist cluster models.

Clause 35. The non-transitory computer-readable medium of Clause 34, wherein the client-side feature vector includes a first set of client context features and the server-side client feature vectors include a plurality of second sets of client context features.

Clause 36. The non-transitory computer-readable medium of Clause 29, further having stored thereon a sequence of instructions for causing the one or more processors to perform:

receiving, by the specialist cluster model, a plurality of items available for selection and a plurality of item feature vectors corresponding to the plurality of items; and selecting, by an item selector, an item from the database of items using the specialist cluster model.

Clause 37. The non-transitory computer-readable medium of Clause 34, further having stored thereon a sequence of instructions for causing the one or more processors to perform:

determining whether to retrain any one of the plurality of mini-specialist cluster models; and retraining, by the model trainer, the mini-specialist cluster models according to the determining.

Clause 38. The non-transitory computer-readable medium of Clause 34, further having stored thereon a sequence of instructions for causing the one or more processors to perform:

reclustering the plurality of mini-specialist cluster models after a predetermined number of requests have been received.

Clause 39. The non-transitory computer-readable medium of Clause 34, further having stored thereon a sequence of instructions for causing the one or more processors to perform:

receiving, from a training frequency calculator, an instruction to retrain the mini-specialist cluster models.

Clause 40. The non-transitory computer-readable medium of Clause 29, further having stored thereon a sequence of instructions for causing the one or more processors to perform:

training, by a model trainer, a contextual bandit for each of the plurality of specialist cluster models on (1) a plurality of client-side feature vectors associated with the client device and (2) a plurality of server-side client feature vectors representing a set of features associated with a plurality of requests from the plurality of client devices, to predict the probability distribution.

Clause 41. The non-transitory computer-readable medium of Clause 40, wherein training the contextual bandit for each of the plurality of specialist cluster models generates a plurality of advocate contextual bandits; and wherein each specialist cluster model is associated with one of the plurality of advocate contextual bandits.

Clause 42. The non-transitory computer-readable medium of Clause 29, further having stored thereon a sequence of instructions for causing the one or more processors to perform:

receiving, by the advocate model via an advocate model interface the client-side feature vector.

What is claimed is:

1. An adaptive multi-model item selection method, comprising:

receiving, from a client device of a plurality of client devices, a request including a client-side feature vector representing a state of the client device;

determining, by an advocate model, a probability distribution of a plurality of specialist cluster models from the client-side feature vector;

choosing, by a use case selector, a cluster corresponding to a use case from the probability distribution; and obtaining, by the use case selector based on the cluster, a specialist cluster model from the plurality of specialist cluster models.

2. The method according to claim 1, further comprising:

selecting, by an item selector interface, an item from a database of items using the specialist cluster model.

3. The method according to claim 2, further comprising:

wherein the item selector interface is a content item selector interface and the item is a content item.

4. The method according to claim 1, further comprising:

scoring, by the advocate model, the client-side feature vector based on an estimate of a probability the client-side feature vector is associated with each cluster of a plurality of clusters.

5. The method according to claim 1, wherein choosing the cluster corresponding to the use case from the probability distribution includes randomly sampling a cluster.

6. The method of claim 1, further comprising:

receiving, from a server, a plurality of server-side client feature vectors, each server-side client feature vector representing any one of (i) a set of item features associated with a plurality of items available to a client device, (ii) a set of client features associated with at least one client device, or (iii) a combination of (i) and (ii);

storing, in a memory, a plurality of mini-specialist cluster models, each mini-specialist cluster model of the plurality of mini-specialist cluster models being (i) associated with a corresponding client-side feature vector and (ii) trained on the plurality of server-side client feature vectors;

clustering the plurality of mini-specialist cluster models to obtain a soft cluster assignment for each of the mini-specialist cluster models, thereby generating a plurality of soft cluster assignments; and training, by a model trainer, each of the plurality of specialist cluster models by combining the plurality of mini-specialist cluster models based on the soft cluster assignments associated with the mini-specialist cluster models.

7. The method of claim 6, wherein the client-side feature vector includes a first set of client context features and the server-side client feature vectors include a plurality of second sets of client context features.

8. A system for multi-model item selection, comprising:
a data communication device configured to receive, from one of a plurality of client devices, a request including a client-side feature vector representing a state of the client device;
a memory device configured to store an advocate model and one or more specialist cluster models;
an analyzer configured to determine, using the advocate model, a probability distribution of a plurality of specialist cluster models from the client-side feature vector; and
a use case selector configured to:
choose a cluster corresponding to a use case from the probability distribution, and
obtain, based on the cluster, a specialist cluster model from the plurality of specialist cluster models.

9. The system according to claim 8, further comprising:
an item selector interface configured to select an item from a database of items using the specialist cluster model.

10. The system according to claim 9, wherein the item selector interface is a content item selector interface and the item is a content item.

11. The system according to claim 8, wherein the advocate model is further configured to score the client-side feature vector based on an estimate of a probability the client-side feature vector is associated with each cluster of a plurality of clusters.

12. The system according to claim 8, wherein the use case selector is further configured to choose the cluster by randomly sampling a cluster from the probability distribution.

13. The system of claim 8, wherein:
the analyzer is further configured to:
receive a plurality of server-side client feature vectors, each server-side client feature vector representing any one of (i) a set of item features associated with a plurality of items available to a client device, (ii) a set of client features associated with at least one client device, or (iii) a combination of (i) and (ii);
the memory device is further configured to:
store a plurality of mini-specialist cluster models, each mini-specialist cluster model of the plurality of mini-specialist cluster models being (i) associated with a corresponding client-side feature vector and (ii) trained on the plurality of server-side client feature vectors;
the analyzer is further configured to:
cluster the plurality of mini-specialist cluster models to obtain a soft cluster assignment for each of the mini-specialist cluster models, thereby generating a plurality of soft cluster assignments; and
further comprising:
a model trainer configured to train each of the plurality of specialist cluster models by combining the plurality of mini-specialist cluster models based on the soft cluster assignments associated with the mini-specialist cluster models.

14. The system of claim 13, wherein the client-side feature vector includes a first set of client context features and the server-side client feature vectors include a plurality of second sets of client context features.

15. A computer system, comprising: one or more processors; and a non-transitory computer-readable storage medium storing instructions that when executed by the one or more processors cause the computer system to perform operations, comprising:
receiving, from a client device of a plurality of client devices, a request including a client-side feature vector representing a state of the client device;
determining, by an advocate model, a probability distribution of a plurality of specialist cluster models from the client-side feature vector;
choosing, by a use case selector, a cluster corresponding to a use case from the probability distribution; and
obtaining, by the use case selector based on the cluster, a specialist cluster model from the plurality of specialist cluster models.

16. The non-transitory computer-readable medium of claim 15, further having stored thereon a sequence of instructions for causing the one or more processors to perform:
selecting, by an item selector, an item from a database of items using the specialist cluster model.

17. The non-transitory computer-readable medium of claim 16, further comprising:
wherein the item selector interface is a content item selector interface and the item is a content item.

18. The non-transitory computer-readable medium of claim 15, further having stored thereon a sequence of instructions for causing the one or more processors to perform:
scoring, by the advocate model, the client-side feature vector based on an estimate of a probability the client-side feature vector is associated with each cluster of a plurality of clusters.

19. The non-transitory computer-readable medium of claim 15, wherein choosing the cluster corresponding to the use case from the probability distribution includes randomly sampling a cluster.

20. The non-transitory computer-readable medium of claim 15, further having stored thereon a sequence of instructions for causing the one or more processors to perform:
receiving, from a server, a plurality of server-side client feature vectors, each server-side client feature vector representing any one of (i) a set of item features associated with a plurality of items available to a client device, (ii) a set of client features associated with at least one client device, or (iii) a combination of (i) and (ii);
storing, in a memory device, a plurality of mini-specialist cluster models, each mini-specialist cluster model of the plurality of mini-specialist cluster models being (i) associated with a corresponding client-side feature vector and (ii) trained on the plurality of server-side client feature vectors;
clustering the plurality of mini-specialist cluster models to obtain a soft cluster assignment for each of the mini-specialist cluster models, thereby generating a plurality of soft cluster assignments; and
training, by a model trainer, each of the plurality of specialist cluster models by combining the plurality of mini-specialist cluster models based on the soft cluster assignments associated with the mini-specialist cluster models.

21. The non-transitory computer-readable medium of claim 20, wherein the client-side feature vector includes a first set of client context features and the server-side client feature vectors include a plurality of second sets of client context features.

\* \* \* \* \*